US012674060B2

(12) United States Patent (10) Patent No.: US 12,674,060 B2
Oehler et al. (45) **Date of Patent: \*Jul. 7, 2026**

(54) PULVERULENT COMPOSITION, MOLDING CONSISTING THEREOF, PROCESS FOR PRODUCING A MOLDING, AND USE OF A PULVERULENT COMPOSITION

(71) Applicant: AM POLYMERS GmbH, Willich (DE)

(72) Inventors: Marc Oehler, Willich (DE); Timur Ünlü, Willich (DE); Andreas Wegner, Willich (DE)

(73) Assignee: AM Polymers GmbH, Willich (DE)

( * ) Notice: Subject to any disclaimer, the term of this patent is extended or adjusted under 35 U.S.C. 154(b) by 112 days.

This patent is subject to a terminal disclaimer.

(21) Appl. No.: 18/566,186

(22) PCT Filed: Mar. 31, 2022

(86) PCT No.: PCT/EP2022/064724

§ 371 (c)(1),
(2) Date: Dec. 1, 2023

(87) PCT Pub. No.: WO2022/258433

PCT Pub. Date: Dec. 15, 2022

(65) Prior Publication Data

US 2024/0240033 A1 Jul. 18, 2024

(30) Foreign Application Priority Data

Jun. 8, 2021 (DE) .......................... 102021114719.0

(51) Int. Cl.
| | |
|---|---|
| *B29C 64/153* | (2017.01) |
| *B33Y 70/00* | (2020.01) |
| *C09D 5/03* | (2006.01) |
| *C09D 177/02* | (2006.01) |
| *C09D 177/06* | (2006.01) |
| *B29K 77/00* | (2006.01) |
| *B29K 105/00* | (2006.01) |
| *B29K 105/16* | (2006.01) |
| *B33Y 10/00* | (2015.01) |

(52) U.S. Cl.
CPC .............. *C09D 5/031* (2013.01); *B33Y 70/00* (2014.12); *C09D 5/038* (2013.01); *C09D 177/02* (2013.01); *C09D 177/06* (2013.01); *B29C 64/153* (2017.08); *B29K 2077/00* (2013.01); *B29K 2105/0085* (2013.01); *B29K 2105/16* (2013.01); *B29K 2105/251* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 7,211,615 | B2 | 5/2007 | Baumann et al. |
| 7,906,063 | B2 | 3/2011 | Monsheimer et al. |
| 10,406,745 | B2 | 9/2019 | Baumann et al. |
| 2004/0204531 | A1 | 10/2004 | Baumann et al. |
| 2007/0197692 | A1 | 8/2007 | Monsheimer et al. |
| 2018/0036938 | A1 | 2/2018 | Baumann et al. |
| 2019/0177537 | A1 | 6/2019 | Gabriel et al. |

FOREIGN PATENT DOCUMENTS

| | | | |
|---|---|---|---|
| CN | 105566894 A | | 5/2016 |
| CN | 109 517 376 A | * | 3/2019 |
| CN | 109593355 A | | 4/2019 |
| CN | 109929242 A | | 6/2019 |
| CN | 110305335 A | | 10/2019 |
| EP | 1443073 A1 | | 8/2004 |
| EP | 3028842 B1 | | 6/2016 |
| EP | 3415563 A1 | | 12/2018 |
| WO | 2005082973 A1 | | 9/2005 |
| WO | 2005082979 A1 | | 9/2005 |
| WO | 2011124588 A1 | | 10/2011 |
| WO | 2014081594 A1 | | 5/2014 |
| WO | WO-2018 019 727 A1 | * | 2/2018 |
| WO | 2018106237 A1 | | 6/2018 |
| WO | 2018140443 A1 | | 8/2018 |
| WO | 2020251524 A1 | | 12/2020 |

OTHER PUBLICATIONS

BASF, "Ultramid (R) 8253 HS-PA6," Campus (R) Datasheet, updated Dec. 29, 2023, https://www.campusplastics.com.
Schmid, "Laser Sintering with Plastics: Technology, Processes, and Materials," Hanser Publications, 2018, accessed Dec. 21, 2023.

* cited by examiner

*Primary Examiner* — Mohammad M Ameen
(74) *Attorney, Agent, or Firm* — McNees Wallace & Nurick LLC

(57) ABSTRACT

A powdery composition contains at least one polyamide (PA) powder and is characterized in that the PA powder comprises a first polyamide (A) selected from the group consisting of PA5.9, PA5.10, PA5.11, PA5.12, PA5.13, PA5.14, PA6, PA6.66, PA6.9, PA6.10, PA10.9, PA10.10, PA10.12, PA10.13, PA12.9, copolymers and mixtures thereof, and the PA powder satisfies the following parameters: a melting point in the range of 180 to 240° C., a melt flow index of 400 cm³/10 min or less, measured at a temperature from 50 to 55° C. above the melting point, a melt flow index of 325 cm³/10 min or less, measured at a temperature from 30 to 35° C. above the melting point, and a melt flow index of 250 cm³/10 min or less, measured at a temperature from 10 to 15° C. above the melting point, each time measured at a test load of 5 kg. Additionally, the pulverulent composition has an elongation at break of at least 5.0% after sintering in a dry, untreated condition. The invention also relates to a molding that consists of such a pulverulent composition, a use of the pulverulent composition and a process for producing a molding.

12 Claims, No Drawings

PULVERULENT COMPOSITION, MOLDING CONSISTING THEREOF, PROCESS FOR PRODUCING A MOLDING, AND USE OF A PULVERULENT COMPOSITION

The invention relates to a powdery composition for use in the production of three-dimensional molded articles through layer-by-layer manufacturing and to said molded articles. Furthermore, the invention relates to a method of producing a molded article and the use of the powdery composition in the production of a molded article.

The quick and cost-effective provision of prototypes and serial parts by methods of additive manufacturing is a task often set recently. So-called powder bed fusion processes based on powdery materials, in which the desired structures are produced in layers by means of selective fusion and delayed solidification are particularly suitable. The methods are also suitable for the production of small-scale series.

Methods that are particularly suitable for the purpose of additive manufacturing or the production of parts in small-scale series are powder bed fusion processes such as HP Multi Jet Fusion™ (MJF), high-speed sintering or Selective Absorption Fusion (SAF™). In these processes, plastic powders contained in a chamber are selectively printed with a liquid absorber and surface exposed, which melts the powder particles covered by the absorber. The melted particles merge and rapidly solidify to form a solid mass. Using this method, three-dimensional bodies can be produced in a simple and quick manner by repeated short exposure of continuously applied layers.

For high-speed sintering, HP Multi Jet Fusion™ or Selective Absorption Fusion (SAF™) plastic powders made of polyester, polyvinyl chloride, polyacetal, polypropylene, polyethylene, polystyrene, polycarbonate, poly-(N-methyl methacrylate) (PMMI), polymethyl methacrylate (PMMA) and polyamide or mixtures thereof can be used.

In laser sintering (LS), another powder bed fusion process, a powder is applied onto a construction platform in a thin layer and fused into the powder bed by means of a laser beam in accordance with the layer contour of the desired part, with layer-by-layer processing in the vertical direction.

From EP 3 028 842 B1 powdery compositions are known comprising at least one powder made of a thermoplastic polypropylene (PP). The powder has a melting point in the range of 125 to 155° C. and a melt flow index at 160° C. (2.16 kg) in the range of 2 to 30 g/10 min.

An essential parameter for the quality of a part formed by powder bed fusion is its elongation at break. Elongation at break is a measure of the deformation capability of a material. If elongation at break is too small, this results in brittle parts not adequately suited for many uses. Not all plastic powders basically suitable for the use in powder bed fusion result in molded articles with sufficient elongation at break.

Thus, there is still a need for plastic powders for use in powder bed fusion processes such as laser sintering or in surface exposure processes such as MJF, high-speed sintering or Selective Absorption Fusion, which allow the production of high-quality molded articles.

According to the present invention, this object is achieved by the powdery composition for use in the production of three-dimensional molded articles through layer-by-layer manufacturing according to claim 1.

Advantageous embodiments of the powdery composition according to the present invention are stated in the sub-claims, which can optionally be combined with each other.

The invention further relates to a method of producing a molded article by using the powdery composition according to the present invention and the use of the powdery composition according to the present invention in the production of a molded article.

Another subject of the invention is a molded article made of the powdery composition according to the present invention.

The powdery composition according to the present invention contains at least one powder made of a polyamide (PA) and is characterized in that the polyamide comprises a first polyamide (A) that is selected from the group consisting of PA5.9, PA5.10, PA5.11, PA5.12, PA5.13, PA5.14, PA6, PA6.66, PA6.9, PA6.10, PA10.9, PA10.10, PA10.12, PA10.13, PA12.9, copolymers and mixtures thereof, and wherein the PA powder has the following parameters:

a melting temperature in the range of 180 to 240° C., a melt flow index of 400 cm$^3$/10 min or less, measured at a temperature from 50 to 55° C. above the melting temperature, a melt flow index of 325 cm$^3$/10 min or less, measured at a temperature from 30 to 35° C. above the melting temperature, and a melt flow index of 250 cm$^3$/10 min or less, measured at a temperature from 10 to 15° C. above the melting temperature, each measured under a test load of 5 kg.

In addition, after sintering, the powdery composition in the dried, unconditioned state has an elongation at break of at least 5.0%.

Previously and in the following the terms "powder made of a polyamide (PA)" and "PA powder" are used as synonyms.

The melt flow index is a parameter for characterizing the viscosity of a plastic powder and is determined according to ISO 1133-1 and ISO 1133-2, with the plastic powder to be tested previously being oven dried for at least 24 hours. Oven drying is performed at 80° C. under vacuum or at 105° C. with circulating air. The measuring temperature is adapted to the melting point of the respective plastic powder to be determined. The melt flow index is determined as the mean value of at least three individual measurements. Here, the melt flow index is defined as melt volume-flow rate (MVR).

It was recognized that for the production of high-quality molded articles through layer-by-layer manufacturing, powdery compositions containing a PA powder of selected polyamides are suitable, wherein the viscosity of the PA powder corresponds to a pre-determined viscosity profile as determinable by measuring the melt flow index.

In particular, the viscosity profile is defined depending on the melting temperature of the PA powder.

Here, the melting temperature of the PA powder is defined as the associated peak temperature of the DSC measurement (DSC: differential scanning calorimetry) of the PA powder. The DSC measurement is performed according to ISO 11357-1.

By limiting the melt flow index of the PA powder in the powdery composition according to the present invention the parts made thereof have a high surface finish and good edge sharpness, making regular post-processing of the parts unnecessary and thus reducing the production costs.

In addition, after sintering, the powdery composition according to the present invention in the dry, unconditioned state and thus a molded article or part made of the powdery composition have a high elongation of break. In other words, the compositions according to the present invention allow to obtain parts having excellent mechanical properties by deliberately limiting the viscosity.

Here, the term "dry, unconditioned state" means that, after sintering, the powdery composition has not absorbed any water. In particular, the water content in the dry, unconditioned state is at most 0.2 weight percent, based on the total weight of the powdery composition after sintering.

The dry, unconditioned state can be achieved and maintained if, after production of the molded article is completed, the molded article cools down in the so-called powder cake under an inert gas atmosphere and is shrink-wrapped in an air- and moisture-tight packaging directly after removing it from the powder cake.

The term "sintering" means the processing of the powdery composition through layer-by-layer manufacturing, for example by powder bed fusion, to form a molded article, part or specimen, wherein the PA powder of the powdery composition is completely melted, layer by layer, by supplying energy, fused with an underlying layer, if applicable, and compressed to form a substantially pore-free article after the melt has solidified.

Elongation at break is determined according to ISO 527-1. The test speed for determining elongation at break is 5 mm/min. To determine elongation at break, the specimens needed (also called "tensile rods") can be produced directly of the powdery composition, for example by selective laser sintering. In particular, the specimens are produced according to ISO 3167 type A or ISO 527-2 type 1A.

The term "elongation at break" means the elongation at break at the construction level of the molded articles or parts made of the powdery composition (also called "elongation at break in x"). For elongation at break in the built-up direction the term "elongation at break in z" is used.

PA Powder

Polyamides are polymers having regular repetitive amide groups along their main chain. The amide group is an amide bond derived from a carboxylic acid and an amine. Polyamides are synthesized, technically usable thermoplastics. They can be derived from primary or secondary amines. For example, aminocarboxylic acids, lactams, polyethylene glycols and/or diamines and dicarboxylic acids can be used as monomers for the polyamides.

Basically, all polyamides comprising the above described first polyamide (A), having a melting temperature from 180 to 240° C., possessing the required viscosity profile and, after sintering, having a sufficiently high elongation at break and in particular further desired properties, for example a desired elastic modulus and/or a desired strength, are suitable for the powdery composition according to the present invention.

The first polyamide (A) is selected from the group consisting of PA5.9, PA5.10, PA5.11, PA5.12, PA5.13, PA5.14, PA6, PA6.66, PA6.9, PA6.10, PA10.9, PA10.10, PA10.12, PA10.13, PA12.9, copolymers and mixtures thereof.

In particular, the first polyamide (A) is selected from the group consisting of PA5.9, PA5.10, PA5.11, PA5.12, PA5.13, PA5.14, PA6, PA6.10, PA10.9, PA10.10, copolymers and mixtures thereof.

In a preferred variant, the polyamide consists of the first polyamide (A).

In another variant, the polyamide is a copolymer or a mixture of the first polyamide (A) and a second polyamide (B), with the first polyamide (A) selected from the group consisting of PA5.9, PA5.10, PA5.11, PA5.12, PA5.13, PA5.14, PA6, PA6.66, PA6.9, PA6.10, PA10.9, PA10.10, PA10.12, PA10.13, PA12.9, copolymers and mixtures thereof, and the second polyamide (B) selected from the group consisting of PA4.6, PA4.10, PA5.6, PA6.6, PA6.12, PA6-3-T, PA6T, PA9T, PA6T.6, PA12T, PA66.6, copolymers and mixtures thereof.

In particular, the polyamide in this variant is a copolymer or a mixture of the first polyamide (A) and the second polyamide (B), with the first polyamide (A) selected from the group consisting of PA5.9, PA5.10, PA5.11, PA5.12, PA5.13, PA5.14, PA6, PA6.10, PA10.10, copolymers and mixtures thereof, and the second polyamide (B) selected from the group consisting of PA4.6, PA4.10, PA5.6, PA6.6, PA6.12, PA6-3-T, PAST, PA9T, PA9T.6, PA12T, PA66.6, copolymers and mixtures thereof.

If the polyamide is a copolymer or a mixture of the first polyamide (A) and the second polyamide (B), the first polyamide (A) is the main component in the copolymer or mixture.

The designations used for the polyamides comply with the notation for naming polyamides common in the state of the art. An overview of selected polyamides and the monomers required for their synthesis are listed in Table 1.

TABLE 1

Overview of polyamide types.

| Polyamide | Monomers |
| --- | --- |
| PA4.6 | Tetramethylene diamine and adipic acid |
| PA4.10 | Tetramethylene diamine and 1,10-decanedioic acid |
| PA5.6 | Pentamethylene diamine and adipic acid |
| PA5.9 | Pentamethylene diamine and azelaic acid |
| PA5.10 | Pentamethylene diamine and 1,10-decanedioic acid |
| PA5.11 | Pentamethylene diamine and aminoundecanoic acid |
| PA5.12 | Pentamethylene diamine and dodecanoic acid |
| PA5.13 | Pentamethylene diamine and brassylic acid |
| PA5.14 | Pentamethylene diamine and tetradecanoic acid |
| PA6 | ε-Caprolactam |
| PA6.6 | Hexamethylene diamine and adipic acid |
| PA6.9 | Hexamethylene diamine and azelaic acid |
| PA6.10 | Hexamethylene diamine and 1,10-decanedioic acid |
| PA6.12 | Hexamethylene diamine and dodecanoic acid |
| PA6.66 | Adipic acid, ε-caprolactam and hexamethylene diamine |
| PA6-3-T | Trimethyl hexamethylene diamine and terephthalic acid |
| PA6T | Hexamethylene diamine and terephthalic acid |
| PA6T.6 | Hexamethylene diamine, terephthalic acid and ε-caprolactam |
| PA9T | Nonyl diamine and terephthalic acid |
| PA10.9 | 1,10 Decamethylene diamine and azelaic acid |
| PA10.10 | 1,10 Decamethylene diamine and 1,10-decanedioic acid |
| PA10.12 | 1,10 Decamethylene diamine and dodecanoic acid |
| PA10.13 | 1,10 Decamethylene diamine and brassylic acid |
| PA12.9 | 1,12-Dodecanedioic acid and azelaic acid |
| PA12T | 1,12-Dodecanedioic acid and terephthalic acid |

Preferably, the first polyamide (A) is selected from the group consisting of PA6, PA10.10, copolymers and mixtures thereof.

In the powdery composition, the PA powder is preferably present in a proportion of at least 55 weight percent, based on the total weight of the powdery composition, preferably in a proportion of at least 60 weight percent.

The powdery composition can consist of the PA powder.

In a variant, the PA powder has a melt flow index of 240 cm³/10 min or less, measured at a temperature from 50 to 55° C. above the melting point, of 160 cm³/10 min or less, measured at a temperature from 30 to 35° C. above the melting point, and of 100 cm³/10 min or less, measured at a temperature from 10 to 15° C. above the melting point, each measured under a test load of 5 kg.

In this case, the first polyamide (A) is particularly selected from the group consisting of PA6, PA10.10, copolymers and mixtures thereof.

The polyamide can have a viscosity number in the range of 125 to 450 mL/g, measured according to ISO 307. To determine the viscosity number a solution of the polyamide in 96% sulfuric acid (w/w) is employed, using the polyamide in a concentration of 0.005 g/mL. Measurement is performed at 25° C.

Properties of the Powdery Composition

Unless stated otherwise, the below property profiles of the powdery composition each refer to the powdery composition prior to the addition of fillers.

After sintering, the powdery composition according to the present invention in the dry, unconditioned state has an elongation at break of at least 5.0%. In particular, after sintering, the powdery composition has an elongation at break in the range of 5.0 to 100%, preferably of 8 to 30%, particularly preferably of 10 to 30%.

In addition, after sintering, the powdery composition in the dry, unconditioned state has in particular an elongation at break in z of 3.0% or more.

After sintering, to allow for further improved mechanical properties, the powdery composition in the dry, unconditioned state can have an elastic modulus of 1,500 MPa or more, in particular an elastic modulus in the range of 2,000 to 4,000 MPa, determined according to ISO 527-1.

In addition, after sintering, the powdery composition in the dry, unconditioned state can have a strength in the range of 45 to 80 MPa, determined according to ISO 527-1.

To determine the elastic modulus and strength, in particular the same specimens according to ISO 3167 (type A) or ISO 527-2 (type 1A) are used as for determining elongation at break.

Furthermore, the powdery composition can have a particle size in the range of 0.1 to 200 μm, preferably of 0.1 to 125 μm. The particle size can be determined by sieve analysis according to DIN 66165-1 and DIN 66165-2, preferably by using an air jet sieve.

The mean particle size $D_{50}$ of the powdery composition is particularly in the range of 30 to 100 μm, preferably of 40 to 90 μm. Here, the mean particle size $D_{50}$ means the volume-related median of the particle size distribution as determinable by dynamic image analysis according to ISO 13322-2.

The bulk density of the powdery composition is particularly at least 330 g/L, preferably the bulk density is from 350 to 750 g/L. According to the present invention, the bulk density is measured according to DIN EN ISO 60.

By using a powdery composition with a high bulk density, as compared to known plastic powders, denser molded articles can be obtained after sintering, which can make achieving a high elongation at break easier. In addition, a higher bulk density leads to improved free-flow properties and dosing, which facilitates the processing of the powdery composition.

The powdery composition can be produced by cold milling of a thermoplastic polyamide (PA) with formation of a ground PA powder and sieving the ground PA powder while separating a sieve fraction of the PA powder.

To this end, a cast polyamide block or polyamide granules can be cooled with liquid nitrogen and ground in a mill to form a fine, powdery material. By sieving the powdery material after milling a sieve fraction of PA powder with a desired grain size distribution is obtained.

Further Constituents of the Powdery Composition

In addition to the PA powder the composition according to the present invention can contain one or more of the following components.

The powdery composition can contain an antioxidant, in particular in a proportion of 0.05 to 10 weight percent, based on the total weight of the powdery composition. The antioxidant can at least partially prevent the polymer chains of the polyamide from breaking down during processing and/or storage and thus improve the mechanical properties of a molded articled made of the powdery composition. The antioxidant can be selected from the group consisting of aromatic amines, phenols, polyphenols, aliphatic hydrocarbons with two or more hydroxy groups, alkali bromides, phosphoric acids and phosphorous acids including their esters and salts, copper complexes as well as other copper compounds and combinations thereof.

Moreover, the powdery composition can comprise a flow additive, in particular in a proportion of 0.01 to 10 weight percent, based on the total weight of the powdery composition. For example, a precipitated or pyrogenic silica, carbon black, aluminum oxid, aluminum silicate and/or other metal oxides can be used as a flow additive.

To facilitate the processing of the powdery composition, the powdery composition can include a lubricant, in particular in a proportion of 0.05 to 15 weight percent, based on the total weight of the powdery composition. Polyolefin waxes, metal soaps, metal stearates, in particular alkali earth stearates, ester-containing complex compounds, fatty acid esters and/or fatty acids with linear carbon chains can be used as a lubricant.

In a variant, the powdery composition comprises a dye, in particular in a proportion of 0.05 to 5 weight percent. When processing polyamide-based compositions, brownish discolorations may occur, in particular at the temperatures required for processing, which can be at least partially compensated by means of the dye added. For example, titanium dioxide, carbon black and/or nigrosine can be used as a dye.

Furthermore, the powdery composition can comprise a fire retardant, in particular in a proportion of 0 to 40 weight percent. Preferably, the flame retardant is halogen-free. In particular, phosphinates, melamine and/or melamine cyanurate can be used as a flame retardant.

In addition, the powdery composition can further contain one or more common fillers, in particular in a proportion of 0 to 40 weight percent. For example, glass beads, glass fibers, carbon fibers, wollastonite, kaolin, ceramic or combinations thereof can be used as a filler.

If both flame retardants and filles are used in the powdery composition, together they have in particular a proportion in the range of 0 to 60 weight percent, based on the total weight of the powdery composition.

The additional components can be added to or compounded into the powdery composition. Antioxidants and lubricants are preferably compounded.

To obtain a powdery composition that is as homogeneous as possible, the grain size of the further components described above can preferably be in the range of the grain size of the PA powder.

In a variant, the powdery composition according to the present invention consists of the PA powder and one or more of the above-described components.

In the following, preferred embodiments of the powdery composition according to the present invention will be described.

Powdery Composition with PA6

In a preferred variant, the first polyamide (A) is PA6. In particular, in this variant, the PA powder consists of the first polyamide (A).

In particular, the PA powder consisting of PA6 has a melting temperature in the range of 200 to 240° C., particularly preferably in the range of 215 to 225° C.

In particular, the PA powder consisting of PA6 has a melt flow index of 240 cm³/10 min or less, preferably of 200 cm³/10 min or less and particularly preferably of 185 cm³/10 min or less, measured at a temperature from 50 to 55° C. above the melting point and under a test load of 5 kg.

In addition, the PA powder consisting of PA6 has in particular a melt flow index of 160 cm³/10 min or less, preferably of 130 cm³/10 min or less and particularly preferably of 110 cm³/10 min or less, measured at a temperature from 30 to 35° C. above the melting point and under a test load of 5 kg.

In addition, the PA powder consisting of PA6 has in particular a melt flow index of 100 cm³/10 min or less, preferably of 80 cm³/10 min or less and particularly preferably of 75 cm³/10 min or less, measured at a temperature from 10 to 15° C. above the melting point and under a test load of 5 kg.

In particular, the PA powder consisting of PA6 has a viscosity number in the range of 125 to 300 mL/g, preferably in the range of 130 to 265 mL/g.

After sintering, the powdery composition according to the present invention, with a PA powder consisting of PA6, in the dry, unconditioned state has an elongation at break in the range of 5.0 to 100%, preferably in the range of 8 to 30%, particularly preferably in the range of 10 to 30%.

In addition, after sintering, the powdery composition, with a PA powder consisting of PA6, in the dry, unconditioned state in particular has a strength in the range of 50 to 80 MPa, preferably of 65 to 75 MPa.

After sintering, the powdery composition, with a PA powder consisting of PA6, in the dry, unconditioned state in particular has an elastic modulus in the range of 2,000 to 4,000 MPa, preferably in the range of 2,400 to 3,700 MPa, particularly preferably in the range of 2,800 to 3,400 MPa.

The bulk density of the powdery composition with a PA powder consisting of PA6 is in particular at least 350 g/L, preferably the bulk density is from 400 to 650 g/L, particularly preferably the bulk density is from 400 to 550 g/L.

In powdery compositions with a PA powder consisting of PA6 in particular an antioxidant, a flame retardant and/or fillers are used as further components.

Powdery Compositions with PA10.10

In a preferred variant, the first polyamide (A) is PA10.10. In particular, in this variant, the PA powder consists of the first polyamide (A).

In particular, the PA powder consisting of PA10.10 has a melting temperature in the range of 180 to 220° C., particularly preferably in the range of 190 to 210° C.

In particular, the PA powder consisting of PA10.10 has a melt flow index of 150 cm³/10 min or less, preferably of 100 cm³/10 min or less and particularly preferably of 70 cm³/10 min or less, measured at a temperature from 50 to 55° C. above the melting point and under a test load of 5 kg.

In addition, the PA powder consisting of PA10.10 has in particular a melt flow index of 70 cm³/10 min or less, preferably of 50 cm³/10 min or less and particularly preferably of 35 cm³/10 min or less, measured at a temperature from 30 to 35° C. above the melting point and under a test load of 5 kg.

Furthermore, the PA powder consisting of PA10.10 has in particular a melt flow index of 40 cm³/10 min or less, preferably of 30 cm³/10 min or less and particularly preferably of 35 cm³/10 min or less, measured at a temperature from 10 to 15° C. above the melting point and under a test load of 5 kg.

In particular, the PA powder consisting of PA10.10 has a viscosity number in the range of 140 to 240 mL/g, preferably in the range of 160 to 220 mL/g.

After sintering, the powdery composition according to the present invention, with a PA powder consisting of PA10.10, in the dry, unconditioned state has an elongation at break in the range of 5.0 to 20%, preferably in the range of 8 to 15%.

In addition, after sintering, the powdery composition, with a PA powder consisting of PA10.10, in the dry, unconditioned state in particular has a strength in the range of 50 to 70 MPa, preferably of 50 to 60 MPa.

In addition, after sintering, the powdery composition, with a PA powder consisting of PA10.10, in the dry, unconditioned state in particular has an elastic modulus in the range of 1,500 to 3,000 MPa, preferably in the range of 1,800 to 2,800 MPa, particularly preferably in the range of 2,000 to 2,500 MPa.

The bulk density of the powdery composition with a PA powder consisting of PA10.10 is in particular at least 350 g/L, preferably the bulk density is from 350 to 650 g/L, particularly preferably the bulk density is from 350 to 500 g/L.

Furthermore, the invention relates to a method of producing a molded article that works on the basis of powdery materials, using a powdery composition of the type described above, and in which the desired structures are produced, layer by layer, by selective sintering or fusing.

In particular, the molded article is produced within a construction space preferably having an atmosphere with an oxygen content of 1.0 volume percent or less.

Another subject of the invention is the use of a powdery composition of the type described above in the production of a molded article that is made layer by layer or additive manufacturing by means of selective sintering or fusing.

In addition, the invention relates to molded articles produced of a powdery composition of the type described above by laser sintering, high-speed sintering, Multi Jet Fusion, Selective Absorption Fusion or another power bed fusion process, by a selective thermoplastic electrophotographic process or by another additive manufacturing process.

In particular, the molded articles according to the present invention have the mechanical properties described above for the powdery composition in the dry, unconditioned state after sintering.

Further advantages and properties of the invention will be evident from the following description of exemplary embodiments, which, however, should not be construed as limiting.

Previously and in the following the abbreviation "MVR (x ° C.)" means the melt flow index in cm³/10 min, measured at a temperature of x ° C., with a test load of 5 kg and determined according to ISO 1133-1 and ISO 1133-2.

In the following, the value stated for elongation at break refers to a tensile rod (specimen) that is made of the respective powdery composition according to ISO 3167, determined according to ISO 527-1.

The viscosity number is determined according to ISO 307.

PA6

TABLE 2

Overview of powdery compositions with PA6.

| Example | Polyamide | Melting temperature in ° C. | Viscosity number in mL/g | Further component |
|---|---|---|---|---|
| 1.1 | PA6 | 222 | 225 | |
| 1.2 | PA6 | 222 | 134 | |
| 1.3 | PA6 | 222 | 225 | Phenol (antioxidant, compounded) |
| 1.4 | PA6 | 222 | 225 | Antioxidant (copper complex, powder mixture) |
| 1.5* | Solvay Sinterline | 210 | n.d. | |
| 1.6* | PA6 | 222 | 107 | |
| 1.7* | PA6 | 209 | n.d. | |

*comparative example, not according to the present invention
n.d.: not determined For comparative examples 1.5 and 1.7 no viscosity numbers were available.

TABLE 3

Properties of the powdery compositions from Table 2.

| Example | MVR (235° C.) | MVR (255° C.) | MVR (275° C.) | Elongation at break |
|---|---|---|---|---|
| 1.1 | 11 | 19 | 33 | 10-30% |
| 1.2 | 71 | 106 | 171 | n.d. |
| 1.3 | 18 | 47 | 145 | 10-21% |
| 1.4 | 7 | 17 | 58 | 8-12% | n.d.: not determined

For comparative example 1.5 from Table 2 the following values were established:

| | |
|---|---|
| MVR (225° C.): | 46 |
| MVR (245° C.): | 182 |
| MVR (265° C.): | 402 |

At the specimen made of comparative example 1.5 an elongation at break of 4.5% was measured.

For comparative example 1.6 from Table 2 the following values were established:

| | |
|---|---|
| MVR (235° C.): | 203 |
| MVR (255° C.): | 387 |
| MVR (275° C.): | 692 |

At the specimen made of comparative example 1.6 an elongation at break of 1 to 2% was measured.

For comparative example 1.7 from Table 2 the following values were established:

| | |
|---|---|
| MVR (225° C.): | 157 |
| MVR (245° C.): | 235 |
| MVR (265° C.): | 499 |

At the specimen made of comparative example 1.7 an elongation at break of 1.5 to 3.2% was measured.

As can be seen from Table 3, specimens with high elongation at break are obtainable from powdery compositions with a PA powder consisting of PA6. In particular, high elongation at break can also be obtained without adding an antioxidant to the powdery composition.

The elastic modulus of the specimens obtained in Examples 1.1 to 1.4 was in the range of 2,800 to 3,300 MPa. The strength of the specimens obtained was in the range of 65 to 75 MPa.

The bulk density of the powdery compositions of Examples 1.1 to 1.4 was in the range of 420 to 550 g/L.

The commercially available product "Solvay Sinterline", comparative example 1.6 with a material that has a viscosity number of 107 mL/g, and comparative example 1.7 do not show the viscosity profile according to the present invention and do not result in specimens with an elongation at break of at least 5.0%.

PA10.10

TABLE 4

Overview of powdery compositions with PA10.10.

| Example | Polyamide | Melting temperature in ° C. | Viscosity number in mL/g |
|---|---|---|---|
| 2.1 | PA10.10 | 200 | 160 |
| 2.2 | PA10.10 | 200 | 180 |
| 2.3* | PA10.10 | 190 | n.d. |

*comparative example, not according to the present invention
n.d.: not determined

TABLE 5

Properties of the powdery compositions from Table 4.

| Example | MVR (215° C.) | MVR (235° C.) | MVR (255° C.) | Elongation at break |
|---|---|---|---|---|
| 2.1 | 20 | 35 | 69 | 9-13% |
| 2.2 | 10 | 22 | 35 | n.d. | n.d.: not determined

For comparative example 2.3 from Table 4 the following values were established:

| | |
|---|---|
| MVR (205° C.): | 110 |
| MVR (225° C.): | 197 |
| MVR (245° C.): | 443 |

At the specimen made of comparative example 2.3 an elongation at break of 2.3% was measured.

As can be seen from Table 5, specimens with high elongation at break are obtainable from powdery compositions with a PA powder consisting of PA10.10. In particular, high elongation at break can also be obtained without adding an antioxidant to the powdery composition.

The elastic modulus of the specimens obtained in Examples 2.1 and 2.2 was in the range of 2,000 to 2,500 MPa. The strength of the specimens obtained was in the range of 50 to 58 MPa. To determine these values, several specimens were produced from the same starting material within a series of measurements.

The bulk density of the powdery compositions of Examples 2.1 and 2.2 was in the range of 360 to 480 g/L.

The invention claimed is:

1. A method of using a powdery composition that includes at least one powder made of a polyamide (PA), wherein:
   the polyamide includes a first polyamide (A) that is selected from a group consisting of PA5.9, PA5.10, PA5.11, PA5.12, PA5.13, PA5.14, PA6, PA6.66, PA6.9, PA6.10, PA10.9, PA10.10, PA10.12, PA10.13, PA12.9, copolymers and mixtures thereof, and wherein the PA powder includes the following parameters:

a melting temperature in the range of 180 to 240° C., a melt flow index of 400 cm³/10 min or less, measured at a temperature from 50 to 55° C. above the melting temperature, a melt flow index of 325 cm³/10 min or less, measured at a temperature from 30 to 35° C. above the melting temperature, and a melt flow index of 250 cm³/10 min or less, measured at a temperature from 10 to 15° C. above the melting temperature, each measured under a test load of 5 kg, wherein the melt flow index is determined according to ISO 1133-1 and ISO 1133-2, with the PA powder to be tested being oven dried for at least 24 hours, and in that, after sintering, the powdery composition in the dried, unconditioned state has an elongation at break of at least 5.0%, wherein the water content in the dry, unconditioned state is at most 0.2 weight percent, based on the total weight of the powdery composition after sintering, and the elongation at break is determined according to ISO 527-1, in a production of a molded article that is made by a layer-by-layer process or by an additive manufacturing via selective sintering or fusing.

2. The method of using powdery composition according to claim 1, wherein the first polyamide (A) is selected from the group consisting of PA5.9, PA5.10, PA5.11, PA5.12, PA5.13, PA5.14, PA6, PA6.10, PA10.10, copolymers and mixtures thereof.

3. The method of using powdery composition according to claim 1, wherein the polyamide is a copolymer or a mixture of the first polyamide (A) and a second polyamide (B), with the second polyamide (B) selected from the group consisting of PA4.6, PA4.10, PA5.6, PA6.6, PA6.12, PA6-3-T, PAST, PAST, PA6T.6, PA12T, PA66.6, copolymers and mixtures thereof.

4. The method of using powdery composition according to claim 1, wherein the PA powder has a melt flow index of 240 cm³/10 min or less, measured at a temperature from 50 to 55° C. above the melting point, of 160 cm³/10 min or less, measured at a temperature from 30 to 35° C. above the melting point, and of 100 cm³/10 min or less, measured at a temperature from 10 to 15° C. above the melting point, each measured under a test load of 5 kg.

5. The method of using powdery composition according to claim 1, wherein after sintering, the powdery composition in the dried, unconditioned state has an elongation at break in the range of 5.0 to 100%.

6. The method of using powdery composition according to claim 1, wherein the powdery composition has one or more of the following parameters:

a particle size in the range of 0.1 to 200 μm, a mean particle size $D_{50}$ in the range of 30 to 100 μm, a bulk density of at least 330 g/L.

7. The method of using powdery composition according to claim 1, wherein the PA powder is present in a proportion of at least 55 weight percent, based on a total weight of the powdery composition.

8. The method of using the powdery composition according to claim 1, wherein the powdery composition comprises one or more of the following components:

an antioxidant in a proportion of 0.05 to 10 weight percent, a flow additive in a proportion of 0.01 to 10 weight percent, a lubricant in a proportion of 0.05 to 15 weight percent, a dye in a proportion of 0.05 to 5 weight percent, a filler in a proportion of 0 to 40 weight percent, a flame retardant in a proportion of 0 to 40 weight percent, and each based on a total weight of the powdery composition.

9. The method of using the powdery composition according to claim 2, wherein the first polyamide (A) is selected from the group consisting of PA6, PA10.10, copolymers and mixtures thereof.

10. The method of using the powdery composition according to claim 6, wherein the powdery composition has one or more of the following parameters:

a particle size in the range of 0.1 to 125 μm;

a mean particle size $D_{50}$ in the range of 40 to 90 μm, a bulk density in the range of 350 to 750 g/L.

11. The method of using the powdery composition according to claim 7, wherein the PA powder is present in a proportion of at least 60 weight percent.

12. The method of using the powdery composition according to claim 1, wherein the powdery composition, after sintering, in the dried, unconditioned state has an elongation at break in a z-direction of at least 3.0% or more.

* * * * *